(12) United States Patent
Gordon

(10) Patent No.: US 11,234,382 B2
(45) Date of Patent: Feb. 1, 2022

(54) SELF-WATERING PLANTER TRAY

(71) Applicant: Jeff Gordon, Hillsboro, OR (US)

(72) Inventor: Jeff Gordon, Hillsboro, OR (US)

(73) Assignee: Jeff Gordon, Hillsboro, OR (US)

( * ) Notice: Subject to any disclaimer, the term of this patent is extended or adjusted under 35 U.S.C. 154(b) by 408 days.

(21) Appl. No.: 15/958,172

(22) Filed: Apr. 20, 2018

(65) Prior Publication Data

US 2019/0320603 A1    Oct. 24, 2019

(51) Int. Cl.
*A01G 27/00* (2006.01)
*A01G 9/02* (2018.01)

(52) U.S. Cl.
CPC ............ *A01G 27/008* (2013.01); *A01G 9/02* (2013.01); *A01G 27/005* (2013.01)

(58) Field of Classification Search
CPC . A01G 9/02; A01G 9/027; A01G 9/04; A01G 9/042; A01G 27/00; A01G 27/005; A01G 27/008
USPC ................... 47/66.1, 71, 79, 39, 48.5
See application file for complete search history.

(56) References Cited

U.S. PATENT DOCUMENTS

| | | | |
|---|---|---|---|
| 2,072,185 A * | 3/1937 | Schein | A01G 27/005 47/81 |
| 2,648,164 A | 8/1953 | Bruch | |
| 3,053,011 A * | 9/1962 | Silverman | A01G 31/06 47/79 |
| 3,482,785 A | 12/1969 | Chapin et al. | |
| 4,295,296 A | 10/1981 | Kinghorn | |
| 4,334,386 A * | 6/1982 | Burcombe | A01G 31/02 47/62 E |
| 4,951,416 A | 8/1990 | Gutridge | |
| 5,020,275 A * | 6/1991 | Bednarzik | A01G 27/003 137/78.3 |
| 5,220,745 A | 6/1993 | Elliot et al. | |
| 5,373,662 A | 12/1994 | Wickstrom | |
| 5,675,932 A * | 10/1997 | Mauney | A01G 31/02 47/17 |
| D393,605 S * | 4/1998 | Dallaire | D11/156 |
| 6,047,499 A * | 4/2000 | Staas | A01G 9/04 47/65.6 |
| 6,145,249 A * | 11/2000 | Boling | A01G 27/04 47/79 |
| 6,622,430 B1 * | 9/2003 | Lai | A01G 27/005 47/79 |
| 7,219,648 B2 | 6/2007 | Muxlow | |
| 7,222,454 B1 | 6/2007 | Chen | |
| 7,418,799 B1 * | 9/2008 | Witt | A01G 27/005 47/48.5 |
| 7,832,146 B2 | 11/2010 | Gordon | |
| 8,453,381 B2 * | 6/2013 | Porter | A01G 27/02 47/65 |
| 9,185,853 B1 * | 11/2015 | Ascherman | A01G 9/02 |
| 9,241,452 B2 * | 1/2016 | Stewart, Jr. | A01G 27/04 |
| 10,149,442 B2 * | 12/2018 | Hohmann | A01G 27/02 |

(Continued)

*Primary Examiner* — Lisa L Tsang

(57) ABSTRACT

A self-watering tray device having an integral internal irrigation system, and a method of watering allowing water to be supplied by a garden water hose and a water faucet. A plurality of said self-watering trays capable of being daisy-chained in a serial configuration to allow a single source of water from a water faucet and a plurality of garden water hoses to provide irrigation water to all of said plurality of self-watering trays and non-self-watering planters positioned thereon.

17 Claims, 8 Drawing Sheets

(56) References Cited

U.S. PATENT DOCUMENTS

| | | | |
|---|---|---|---|
| 11,083,144 B2* | 8/2021 | Proulx | A01G 9/0297 |
| 2006/0156626 A1 | 7/2006 | Seaman | |
| 2014/0075840 A1* | 3/2014 | Gosling | A01G 9/02 47/81 |
| 2015/0181814 A1* | 7/2015 | Pence | A01G 9/023 47/66.7 |
| 2017/0188528 A1 | 7/2017 | Gordon | |
| 2018/0064041 A1* | 3/2018 | Brigham | A01G 27/04 |
| 2021/0185941 A1* | 6/2021 | Wagner | A01G 25/06 |

* cited by examiner

SELF-WATERING PLANTER TRAY

BACKGROUND OF THE DISCLOSURE

Field of the Disclosure

The present invention relates generally to a self-watering tray and, more specifically, to a method for placing a conventional planter container for housing a plant on said self-watering tray and watering said plant by aid self-watering tray, said self-watering tray connected to a water source with a standard garden water hose or a low pressure irrigation plumbing.

Description of the Related Art

A planter with a plant requires frequent watering or else said plant or plants therein will quickly wither and die. This is true in moderate as well as hot climates, since said planters hold a relatively small volume of soil and are exposed on all sides and therefore suffer rapid loss of moisture through evaporation. Moreover, planters are frequently located under eaves, deck coverings, trees or other features that obstruct or limit access to rain water The need for frequent and routine watering places a significant burden on a homeowner or a gardener. The burden is especially difficult for said homeowner or said gardener who are subject to busy work schedules, as well as for the elderly and persons having limited mobility.

Moreover, the need for frequent watering can become burdensome for said homeowner or said gardener if the person is absent for a significant period of time—when away on vacation, for example—unless the person can enlist the temporary services of a neighbor, friend or family member to tend to the watering. These difficulties have been well known and a number of solutions have been proposed over the years. While often effective in the sense of being able to achieve a degree of watering, none have represented an entirely satisfactory solution.

Certain of these prior devices have relied on electrically updated valves and controls. This approach has become increasingly common in recent years, however, it remains prohibitively expensive to provide a valve and an electric controller for each of said planter(s); moreover, to do so would require running not only a water line but also an electrical cord to each and every of said planter(s). Certain electrically-operated systems have been developed that employ a central controller and a valve assembly from which irrigation tubing is routed to individual destinations, however, this means that a multitude of tubes must be routed from their origin (typically, a garage or basement location) to the various plants Other automatic watering devices have been developed that do not rely on electrical power for their operation and are therefore free from some of the complications noted above. However, a satisfactory solution has remained elusive.

A few such non-electric devices have relied on structures or materials having physical characteristics that respond in some way to changes in moisture—for example, the swelling of a piece of wood—but as a group such mechanisms exhibit poor reliability and long-term durability. Others have been actuated by changes in height as the amount of water in the container increases/decrease, which offers the prospect of far more reliable operation; however, such mechanisms have generally been deficient for a number of reasons. For example, many gravity-operated mechanisms are excessively complex and/or cumbersome and are bulky and too expensive to be used with individual planters, especially where a yard or a deck contains a number of said planters. The bulky, visually obtrusive appearance of many of these devices also renders them unsatisfactory from an aesthetic standpoint. Moreover, many of the mechanically operated devices are intended to operate in conjunction with an associated reservoir (e.g., a small water tank), which is only a partial solution, since the owner must replenish the reservoir itself on a periodic basis.

A few devices have been developed that take the more effective approach of controlling the flow of water through small-diameter tubing that can be connected to a tap or another pressure source and can be strung, unobtrusively, along a deck railing or other support.

However, many of these devices require parts that must be machined, cast or molded with very close tolerances making such devices very expensive. Other devices require the use of soft flexible tubing folded to cut off the flow of water and allowed to straighten enough to allow the flow of water to the planter using some sort of spring mechanism.

These types of devices, however, in that the need to flatten or flex the rubber tubing is somewhat difficult to achieve fine adjustments.

All of these devices whether electrical or mechanical require separate water lines to each planter and in many cases separate electrical and/or valves or valve controls for each said planter.

One such apparatus meeting these requirements provides irrigation by way of a water dispensing device across a portion of the top of a planter covering a portion of the planter's open top surface area, thus reducing a plantable surface area. Additionally, it is, for practical purposes, restricted to rectangular planters. Another such apparatus comprises a planter container that incorporates the irrigation functionality as an integral part of said planter and which can utilize a standard low pressure watering system such as a standard garden water hose to provide irrigation.

Accordingly, there exists a need for self-watering tray devices upon which conventional containers or planters for housing plants may be placed upon said self-watering tray device unit adaptable to connection to a standard garden water hose or other low pressure irrigation plumbing, and timing apparatus. Further, there exists a need for the ability to "daisy-chain" multiple self-watering tray devices upon which are positioned planters together so only one water line need be provided from a water source to irrigate all of the planters on a deck, a patio, a yard, or combinations thereof. Still further, there exists a need for such an integrated apparatus that is inexpensive to manufacture and that is durable and long-lasting in use and can adapt convention non-watering conventional containers and/or planters to provide self-watering irrigation to such said convention containers and/or planters. Additionally, there remains a need for such a self-watering device that allows for the use of convention containers and/or planters of a wide range of physical sizes irrespective of the self-watering tray size or geometry.

SUMMARY OF THE DISCLOSURE

The present disclosure is directed a self-watering tray upon which a plant container/planter apparatus of various desired geometric configurations, the plant container/planter having no integral irrigation system (conventional plant container/planter) that can be thereby utilize a standard garden water hose to supply water and in which a plurality of such planter apparatus can be daisy-chained together to allow a single water source connection to irrigate all of the plurality of said self-watering trays with non-self-watering plant containers/planters positioned thereon.

More particularly, the disclosure provides a self-watering tray of various desired geometric configuration with an integral irrigation system that may be set on the ground or patio or deck surface, hung from a deck or other railing, or mounted on a vertical surface such as a wall or post, wherein said self-watering tray may be connected to said standard garden water hose connected to a water source allowing said non-self-watering plant container/planter to be positioned and utilize the self-watering function of said self-watering tray.

One object of the present invention is providing a self-watering tray apparatus of various desired geometric configuration having an integral irrigation system connectable to an existing standard garden water hose or other low pressure water distribution system without the need for special fittings or modifications of said self-watering tray apparatus or said non-self-watering plant container/planter conventional planter apparatus.

An object of the present disclosure is providing said self-watering tray for watering plants said self-watering tray having non-self-watering container having a substantially centered drainage orifice through which a water distribution channel riser may pass. The said non-self-watering container mounted atop said self-watering tray. Said self-watering tray comprising a self-watering tray container having a tubular side wall with a proximal open top end and a distal closed bottom end, said distal closed bottom end having a water manifold mounting channels at substantially right angles to one another and an internal water distribution channel receiving bore; an integral irrigation system comprising at least one internal water manifold having a water input female connector and a water exit male connector for connection of standard garden water hose, and an internal water distribution channel, said internal water distribution channel having a distal end connected to said water manifold being substantially centered within said self-watering tray container and having a proximal end having a water outlet orifice, thereby providing said self-watering tray having an integral water irrigation system contained therein and dimensioned to allow said non-self-watering container to receive irrigation water supplied by a single water source by means of a standard garden water hose.

Yet another object of the present invention is providing a plurality of self-watering trays for watering plants in an equal plurality of non-self-watering containers, each said non-self-watering container having a substantially centered drainage orifice, positioned atop said plurality of self-watering trays from a single water source by means of connecting said plurality of self-watering trays to each other in a serial daisy-chain configuration, each of said plurality of self-watering trays comprising: a self-watering tray container having a substantially tubular side wall with a distal closed bottom end and a proximal open top end; an integral irrigation system comprising an internal water manifold having a water input female connector and a water exit male connector for connection to desired lengths of a garden water hose, and at least one internal water distribution channel, each of said at least one internal water distribution channels having a distal end connected to said water manifold and a proximal end having at least one water outlet orifice; desired lengths of said garden water hose necessary for providing connection between a single water source and said plurality of self-watering planters; thereby providing a self-water planter having an integral water irrigation system contained therein through which water may be supplied by said single water source by means of said desired lengths of standard garden water hose.

Still another object of the present invention is providing self-watering trays connected in a serial daisy-chain configuration wherein, there are two water distribution channels at substantially right angles and one water manifold mounted in one of said two water distribution channels.

Yet still another object of the present invention is providing a method of watering plants contained in a plurality of conventional plant containers/planters each said conventional plant container/planter positioned on a self-watering tray utilizing a single water source and common standard garden water hose to provide water to all of said self-watering trays and conventional plant containers/planters positioned thereon.

Beneficial effects of the present disclosure include the ability to use existing water faucets, and common garden hose to provide irrigation water to one or more of the claimed self-watering trays as well as to allow for easy and economical connection of said one or more self-watering trays to an existing lawn/garden watering system. Additional benefits include saving water, prevention of non-desired growth within and without the self-watering tray and positioned conventional plant containers/planters, and the inconvenience of water getting on structures and/or furniture as common with the use of conventional sprinklers.

A complete understanding of the present disclosure may be obtained from the drawings and detailed description that follow.

DETAILED DESCRIPTION

This presently disclosed apparatus was developed to provide an efficient and aesthetically pleasing method of irrigating a planter of various desired geometric configuration or a plurality of planters of various desired geometric configurations requiring only a common standard garden water hose or hoses to provide the water to said planter or all of said plurality of planters no matter the number. In addition, it was developed to allow for easy automatic planter irrigation on a deck, a patio, and landscaping using an available water facet and/or a lawn watering system without the need for a separate water and/or an electrical line to each said planter or said plurality of planters.

Figure 1:
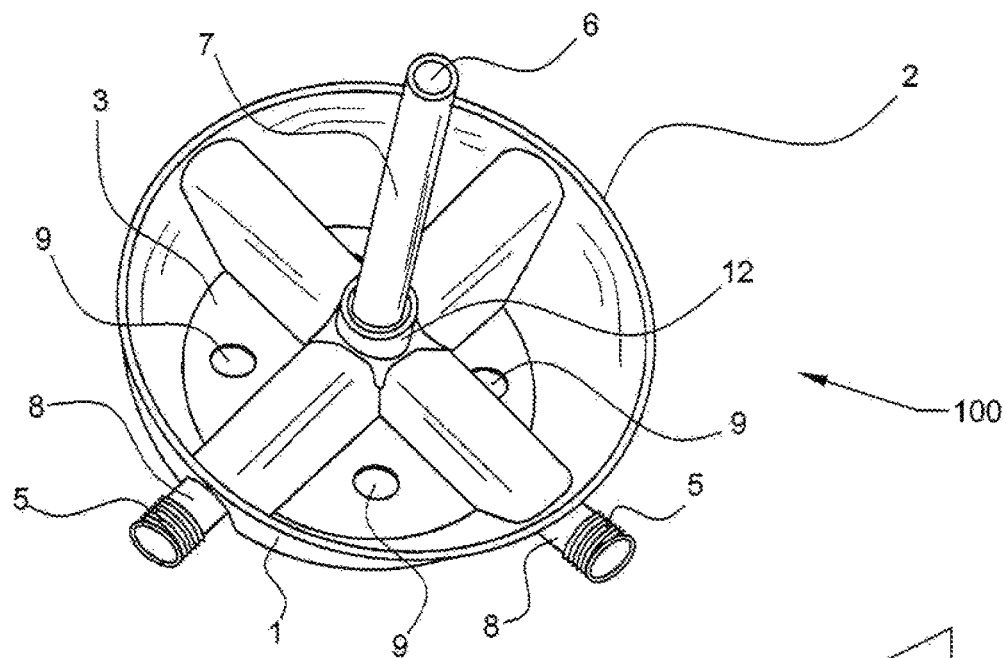
FIG. 1 shows a top perspective view of an embodiment of the present disclosure showing a self-watering tray

Turning to FIG. 1, there is shown a top perspective view of an embodiment of the present disclosure. A self-watering tray 100 has a self-watering tray container 100A that has a proximal (top) open end 2 (see also FIG. 8), a tray body sides 1, a distal (bottom) end 3 (see also FIGS. 3, 5, 7) with an optional drainage orifice(s) 9. Self-watering tray 100 further has an integral irrigation system 100B comprising an internal water manifold 8 with a water exit male connector 5 and a water input female connector 4 for connection to a garden water hose, said water manifold 8 mounted in a water manifold mounting channel 11 has an inverse U-shape and sized to receive and secure said internal water manifold (see FIGS. 2, 3 and 5-7). Self-watering tray further having a water distribution channel riser 7 centered within said self-watering tray container, said water distribution channel riser having a distal end connected to said internal water manifold and a proximal end with a water distribution channel riser outlet orifice 6. The water distribution channel riser positioned within said tray 100 through a water riser mounting bore 12.

Figure 2:
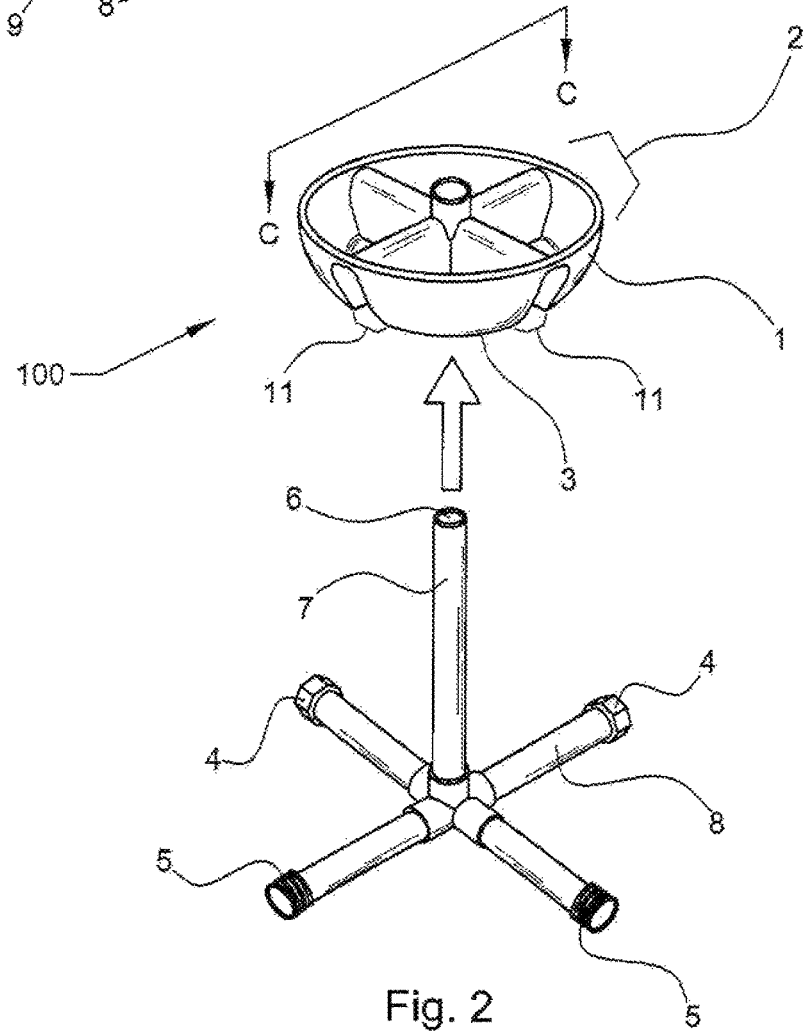
FIG. 2 shows a side perspective side view of that shown in FIG. 1.

FIG. 2 shows an exploded side perspective side view of the embodiment of the invention of FIG. 1 showing said tray body 100 with said proximal open top end 2, (see FIG. 3) said distal closed bottom end 3 (see also FIGS. 3, 5, 7) having said water manifold mounting channel 11 with said water manifold 8 and said water distribution channel riser 7 in position to be mounted in said water manifold mounting channel 11 and said water riser mounting bore 12 (see FIG. 1). Also shown are said water distribution channel riser outlet orifice 6, a water manifold input connector 4, and a water manifold exit connector 5

Figure 3:
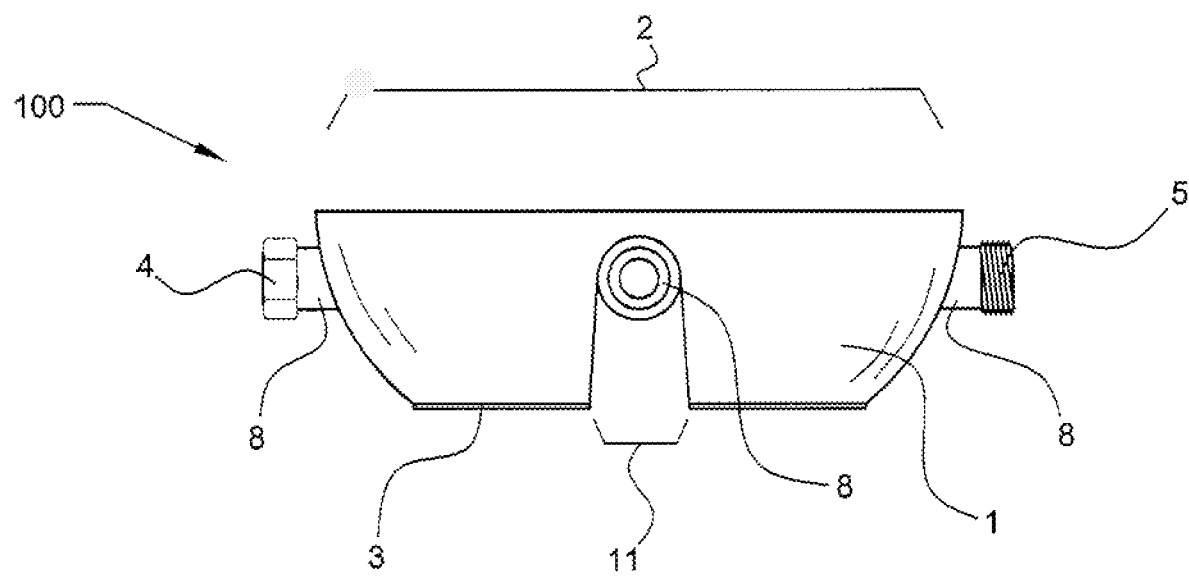
FIG. 3 shows a plan side view of that shown in FIG. 1.

FIG. 3 shows a plan side view of the embodiment of the self-watering tray 100 invention of FIG. 1 showing said tray body 100 having said side wall 1 that is tubular, said proximal (top) open end 2, said distal (bottom) end 3 with said water manifold 8 mounted in said water manifold mounting channel 11, also shown are said water manifold input connector 4, and said water manifold exit connector 5.

Figure 4:
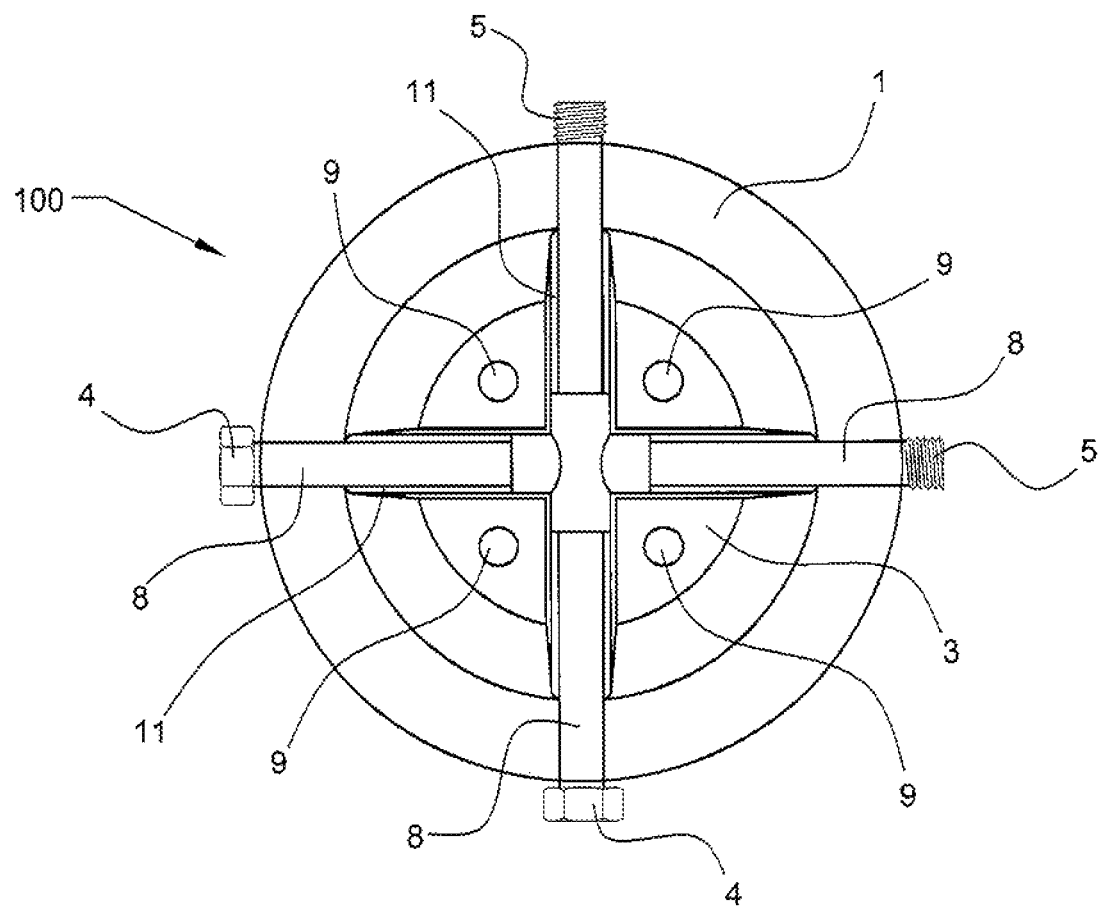
FIG. 4 shows a plan bottom view of the preferred embodiment of the disclosure of Figure.

Turning now to FIG. 4, a plan bottom view of the embodiment of said self-watering tray 100 of FIG. 1 shows side wall 1. Self-watering tray 100 has said distal (bottom) end 3 with optional said drainage orifices 9 and said water manifold 8 mounted in said water manifold mounting channel 11 (see FIGS. 2 & 3) of said tray body distal bottom end 3. Also shown is said water manifold water inlet water connector(s) 4 and said water manifold water exit connector(s) 5.

Figure 5:
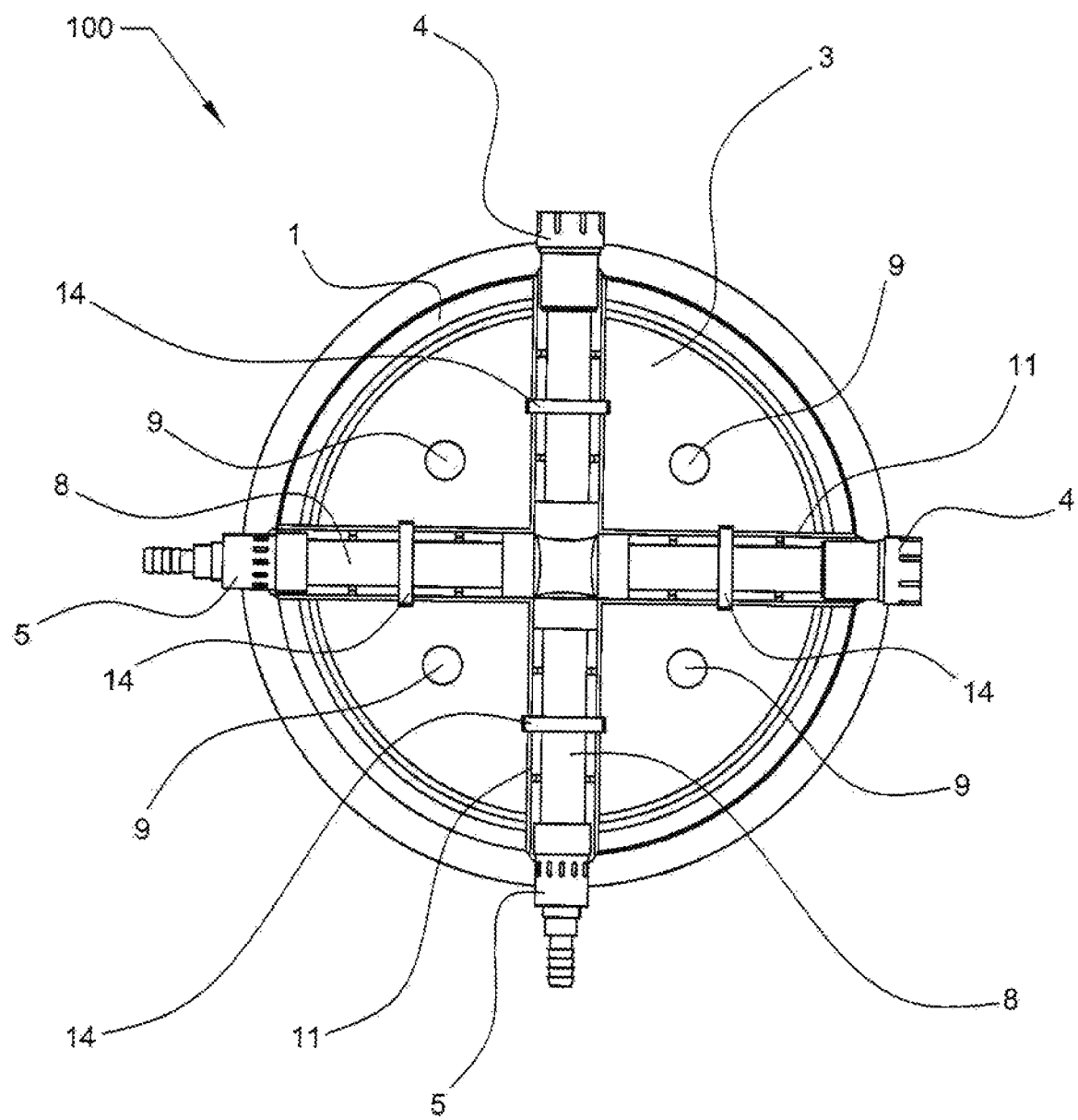
FIG. 5 shows another plan bottom plan view of an embodiment of the present disclosure.

FIG. 5 shows a plan bottom view of the self-watering tray 100 showing said tubular side wall 1, having said distal (bottom) end 3 with optional said drainage orifices 9 and said water manifold mounting channel 11 having said water manifold 8 fixedly mounted therein by a mounting fastener 14 through a fastener bores 15 (see FIGS. 6, 7) of said tray body distal bottom end 3. Also shown are said water manifold water inlet water connector(s) 4 and said water manifold water exit connector(s) 5.

Figure 6:
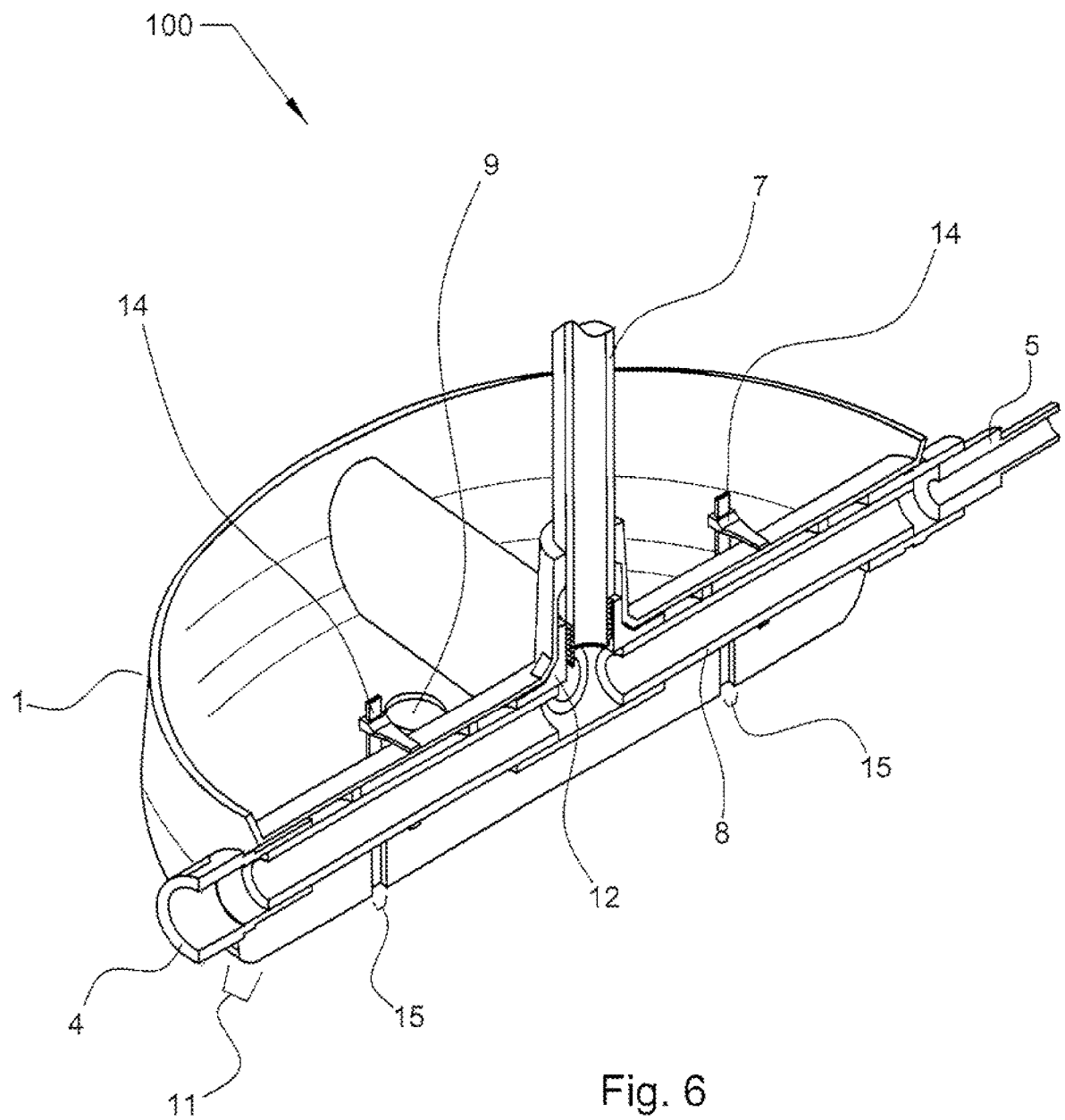
FIG. 6 shows a perspective view with a cross-section (C-C of FIG. 2) showing the detail of the internal water manifolds mounted in said water mounting channels using mounting fasteners as well as the connection of said water distribution channel riser to said water manifold.

FIG. 6 shows a lower portion plan sectional side view through section line C-C of FIG. 2 showing said tray body 100 having a tubular side wall 1, a distal closed bottom end 3 (see FIGS. 1-5) showing an optional said drainage orifice 9 and further having said water manifold mounting channel(s) 11 (and see FIGS. 2-5) with said water manifold(s) 8 mounted in said water manifold mounting channel(s) 11 and said water distribution channel riser 7 mounted in said water riser mounting bore 12. Also shown are said water manifold input connector 4, and said water manifold exit connector 5, and said water manifold mounting fasteners 14 fixedly mounting said water manifold 8 and said water distribution channel riser 7 to said tray body 100 through said water manifold mounting fastener bores 15.

Figure 7:
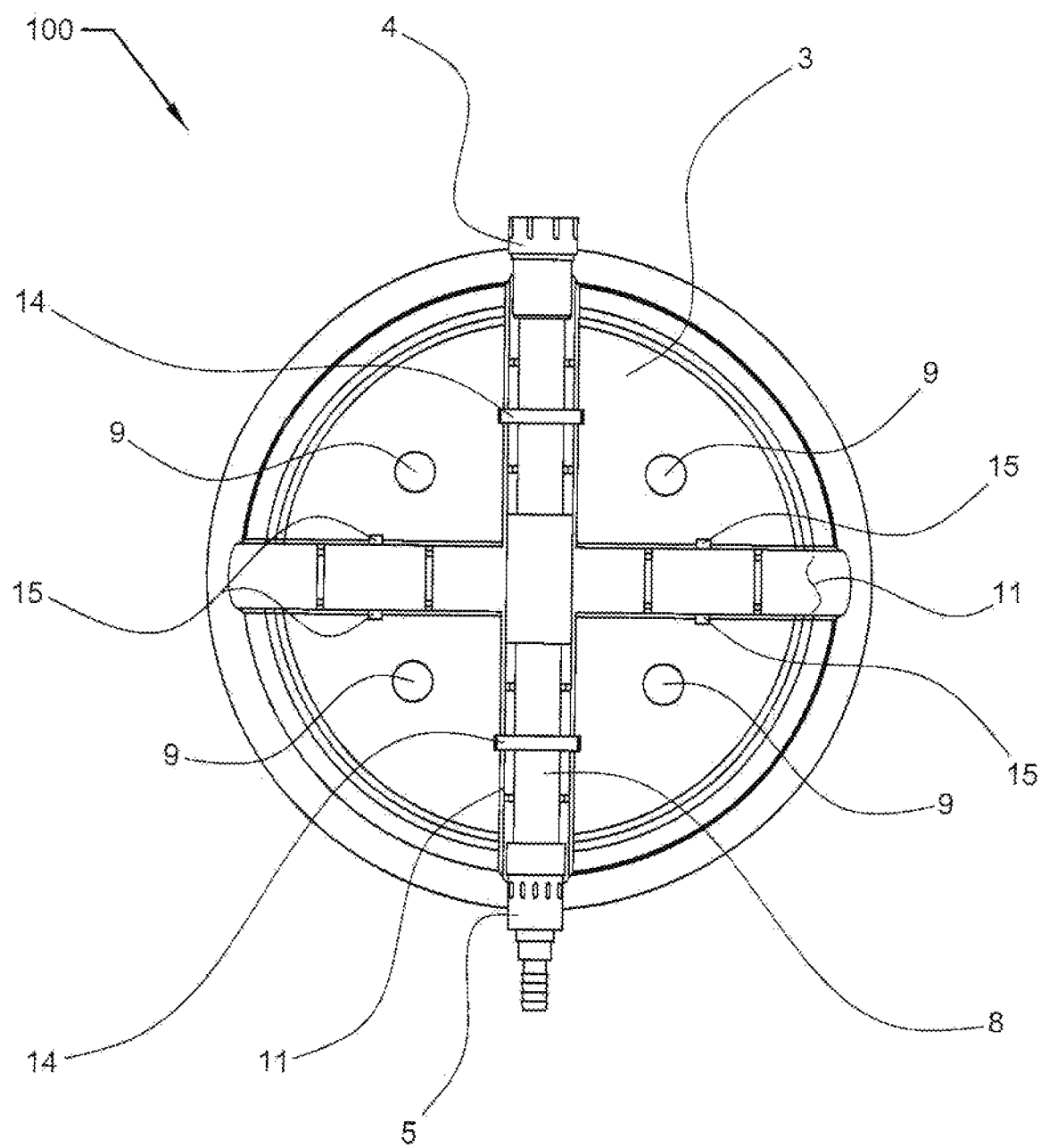
FIG. 7 shows a bottom plan view of the presently claimed apparatus.

FIG. 7 shows a plan bottom view of said self-watering tray 100 invention of FIG. 1 showing side wall 1 (see FIGS. 1-6), having said distal (bottom) end 3 with said drainage orifices 9 and said water manifold mounting channel 11 having said water manifold mounting fasteners 14 fixedly mounting said water manifold 8 through said water manifold mounting fastener bores 15 of said tray body distal bottom end 3.

Figure 8:
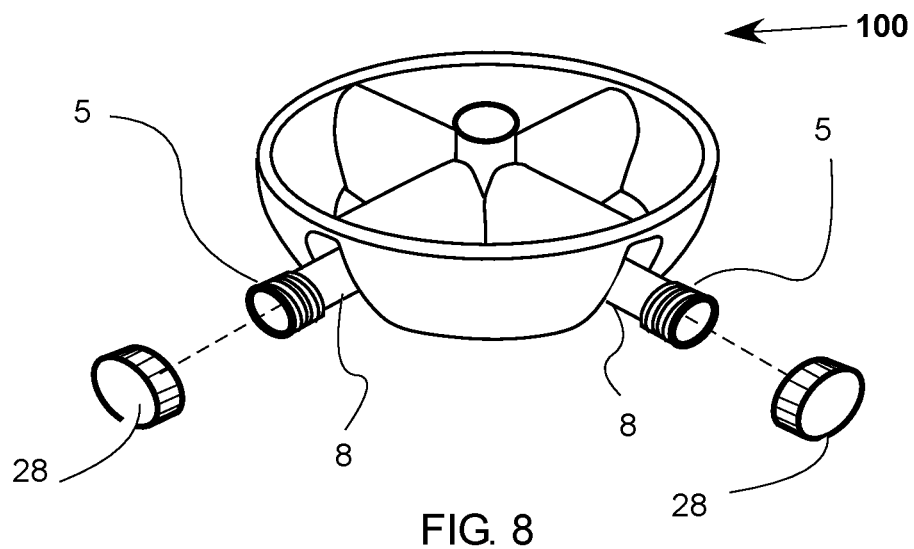
FIG. 8 shows a perspective view of that shown in FIG. 1, further comprising a terminal end cap.
Figure 9:
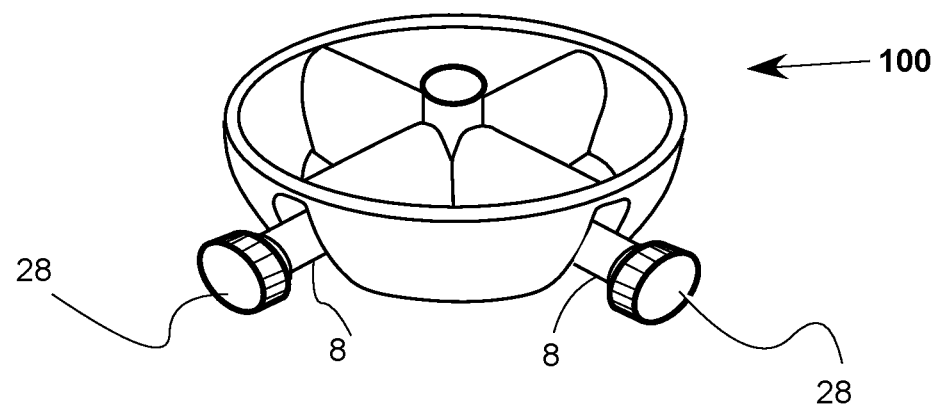
FIG. 9 shows another perspective view of that shown in FIG. 8.

FIG. 8 and FIG. 9 each show a perspective view of that shown in FIG. 1, further comprising a terminal end cap 28 on said male exit water connector 5 of said internal water manifold 8. Said terminal cap end 28 sealing said internal water manifold 8.

Figure 10:
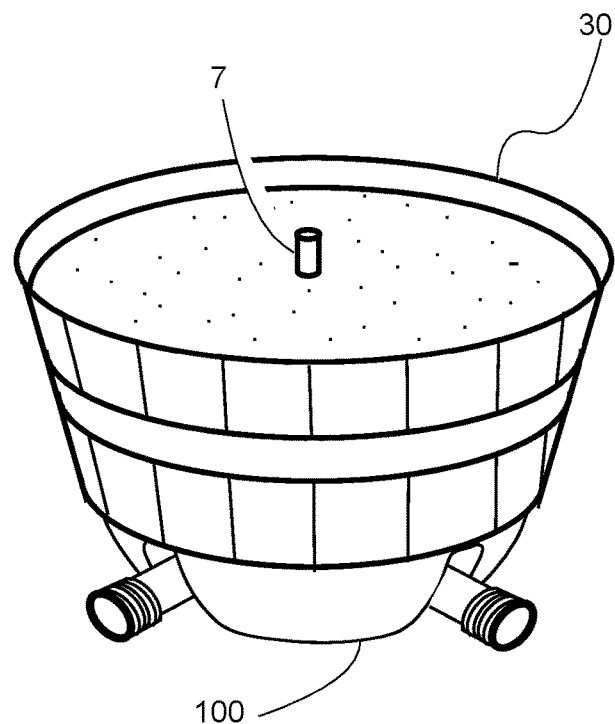
FIG. 10 shows a perspective view of the self-watering tray shown in FIG. 1 with a planter.
Figure 11:
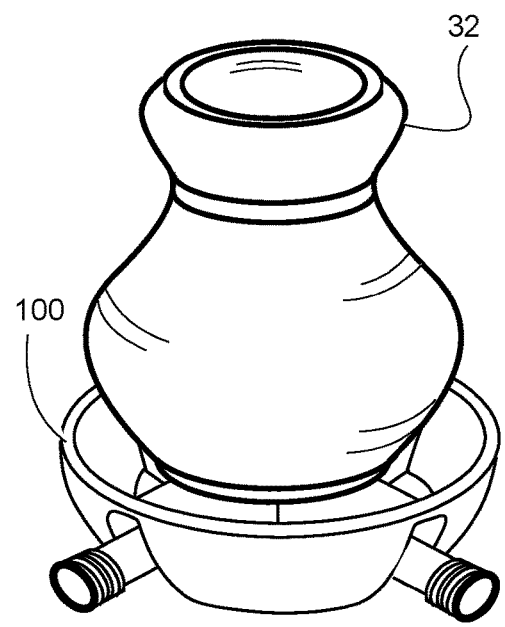
FIG. 11 shows another perspective view of the self-watering tray shown in FIG. 1 with yet another planter.
Figure 12A:
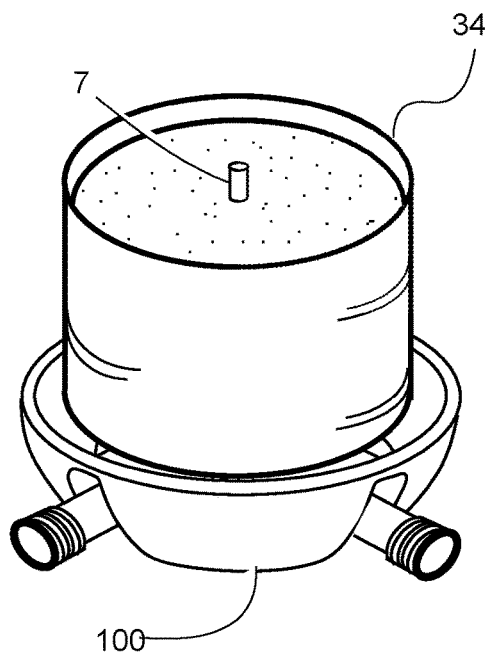
FIG. 12A shows yet another perspective view of the self-watering tray shown in FIG. 1 with another planter.
Figure 12B:
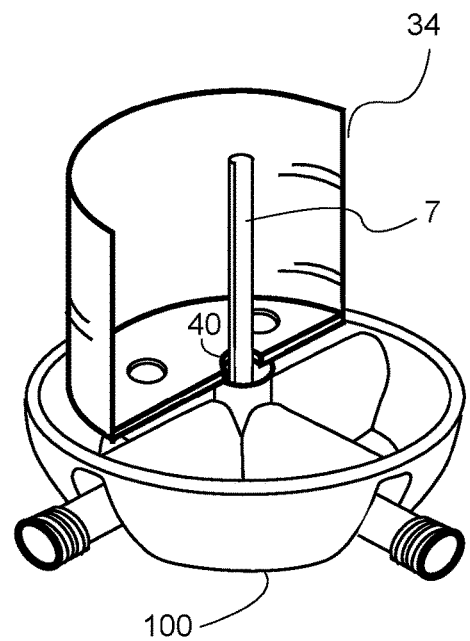
FIG. 12B shows yet another view of the self-watering tray shown in FIG. 1 with yet another planter.

FIG. 10, FIG. 11, and FIG. 12A each show said self-watering trays 100, further showing a planter 30, a planter 32, and a planter 34, respectively. Said plant 30, 32, and 34 are standard or conventional planters known in the art. Said planter 30 is sized larger than said self-watering tray 100. Said planter 32 is sized smaller than self-watering 32. FIG. 12B further shows said planter 34 in a cross-section view. Planter 34 has a centered drainage orifice 40 through which said water distribution channel riser 7 passes.

Figure 13:
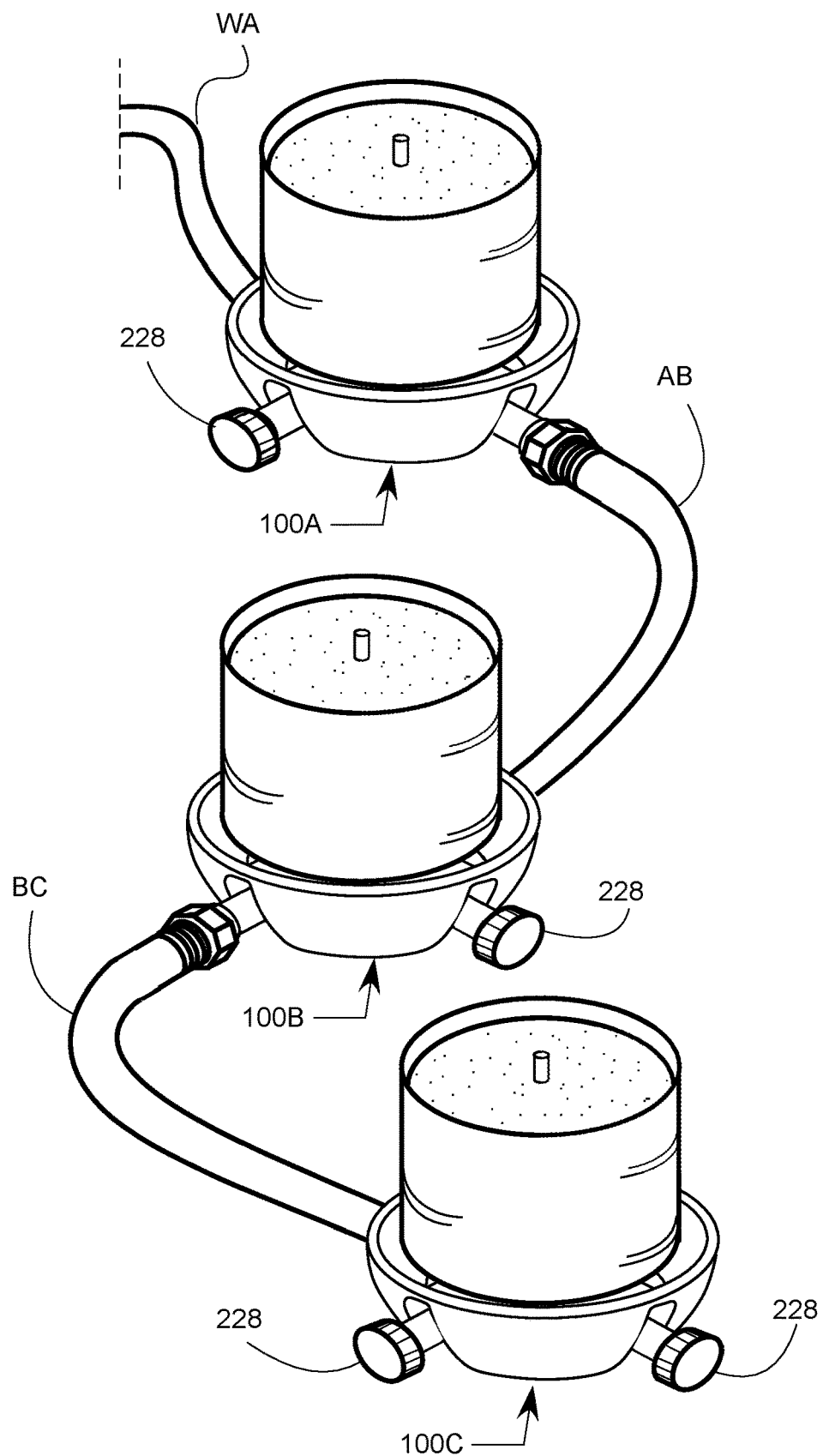
FIG. 13 shows a plurality of the self-watering trays in a daisy chain configuration.

FIG. 13 provides a plurality of said self-watering trays in a daisy chain configuration 200. A hose WA provides water to a self-watering tray 100A (spigot not shown). Said self-watering tray 100A is connected to a self-watering tray 100B with a hose AB. A self-watering tray 100B is then connected to a self-watering tray 100C with a hose BC. Any male end connectors without a hose attached are sealed with a terminal end caps 228.

The use of the term "of various desired geometric configuration" and the like includes various tray shapes and/or styles such as, for example, circular, oval, and rectangular, as are well known in the art.

The use of the term "standard garden water hose" and the like includes garden water hose, and other lawn and garden irrigation piping and hose commonly sold for such uses and which is well known in the art such as, for example, standard polyvinyl chloride (PVC) plumbing, standard Acrylonitrile-Butadiene-Styrene (ABS) plumbing, low pressure poly rolled irrigation pipe, and combinations thereof. The means of connecting said well-known water supply means also being well known in the art such as, for example, slip/glue fittings, threaded fittings, compression fittings, and barbed plastic fittings.

The term "sprinkler head" is used in the well-known and accepted definition to include commercially available lawn sprinkler heads used in underground lawn irrigation systems and the like.

While one embodiment of the claimed invention has two manifold mounting channels and two water manifolds at right angles to one another suitable another embodiment has one manifold mounting channel and one water manifold.

"Mounting fasteners" can be nylon cable ties. However, any similar fasteners well-known in the art are suitable as are other styles of fasteners, for example, U-bolt style fasteners.

It is to be understood that a wide range of sizes of non-self-watering conventional containers/planters are suitable for use with a single sized self-watering tray. Non-self-watering conventional containers/planters having a bottom dimensioned smaller than the self-watering tray top edge dimensions are positioned on and supported by the top surfaces of the water manifold mounting channels. Non-self-watering conventional containers/planters having a bottom dimensioned larger than the self-watering tray top edge dimensions are positioned on and supported by the tray open end top rim.

Additionally, the self-watering planter trays of the present invention can be used on the same water supply system as other devices such as sprinklers, soakers, and the like as are well known in the art.

Finally, it is to be understood that while the preferred embodiments of the claimed self-watering tray have drainage orifices 9, such drainage orifices 9 are not required and for use on surfaces that a user doesn't want to be water stained from water drainage from the bottom of the self-watering tray a lack of said drainage orifices 9 is contemplated.

With respect to manufacture, in some embodiments, said self-watering tray and associated said integral water manifold system are formed by injection molding, however other methods for forming the various parts such as, for example, extrusion, and machining, are also contemplated. All of the various parts may be constructed of the same material or of various different materials within the knowledge of those skilled in art.

In another presently preferred embodiment the tray of the claimed invention is formed of pottery using methods of production well known in the art.

Although the preferred embodiments of the present invention have been disclosed, various changes and modifications may be made without departing from the scope of the invention as set forth in the appended claims.

What is claimed is:

1. A self-watering tray for watering a plant comprising:
   a self-watering tray container having a tubular side wall with a proximal open top end and a distal closed bottom end, said distal closed bottom end having a water manifold mounting channels with an inversed U-shaped defined by radially-extending walls and with an internal water distribution channel receiving bore intersecting said water manifold mounting channel;
   an integral irrigation system comprising at least one internal water manifold having a water input female connector and a water exit male connector for connection to a garden water hose, said water manifold mounting channel sized to receive and secure said at least one internal water manifold, and a water distribution channel riser, said water distribution channel riser having a distal end connected to said at least one internal water manifold, said water distribution channel riser extending through said internal water distribution channel receiving bore, the water distribution channel riser centered within said self-watering tray container and extending upwardly into a non-self-watering container situated atop said self-watering tray container, the water distribution channel riser having a proximal end having a water outlet orifice; and
   thereby providing a said self-watering tray, said self-watering tray dimensioned to allow a non-self-watering container to receive irrigation water supplied by a water source by means of the garden water hose.

2. The self-watering tray as claimed in claim 1, wherein said at least one internal water manifold is fixedly attached to said self-watering tray container with cable ties.

3. The self-watering tray as claimed in claim 1, wherein said at least one internal water manifold is mounted in said water manifold mounting channel with cable ties.

4. The self-watering tray as claimed in claim 1, wherein said at least one internal water manifold comprises two internal water manifolds mounted in said water manifold mounting channel, said two internal water manifolds positioned at right angles to one another.

5. The self-watering tray as claimed in claim 1, wherein said self-watering tray container distal closed bottom end has at least one drainage orifice.

6. The self-watering tray as claimed in claim 1, wherein said self-watering tray container distal closed bottom end has no drainage orifices.

7. The self-watering tray as claimed in claim 1, wherein said water manifold and said at least one water distribution channel riser is made from polyvinyl chloride (PVC) tubular pipe.

8. The self-watering tray as claimed in claim 1, wherein said self-watering tray is suitable to position the non-self-watering container, wherein the non-self-watering container is one of a plurality of sizes.

9. A plurality of self-watering trays for watering plants in an equal plurality of non-self-watering planters containing said plants, each of said plurality of self-watering trays comprising:
   a tray container having a tubular side wall with a distal closed bottom end and a proximal open top end, said distal closed bottom end having a water manifold mounting channel with an inversed U-shape defined by radially-extending walls and with an internal water distribution channel receiving bore intersecting said water manifold mounting channel;
   an integral irrigation system comprising an internal water manifold having a water input female connector and a water exit male connector for connection to desired lengths of garden water hoses, the water manifold mounting channel sized to receive and secure said internal water manifold, and at least one internal water distribution channel riser centered within said tray container and extending upwardly into one of said plurality of non-self-watering planters situated atop said tray container, each of said at least one internal water distribution channel riser having a distal end connected to said internal water manifold, each of said at least one internal water distribution channel riser extending through said internal water distribution channel receiving bore, each of said at least one internal water distribution channel risers having a proximal end having at least one water outlet orifice; and
   desired lengths of said garden water hoses necessary for providing connection between a single water source and said plurality of self-watering trays, wherein at least one of said plurality of garden water hoses is attached to said single water source and one of said plurality of self-watering trays, and the said plurality of self-watering trays connect in a serial daisy chain configuration with the remaining plurality of garden hoses.

10. The self-watering trays as claimed in claim 9, wherein said garden water hoses are selected from the group consisting of: flexible water hose, flexible lawn and garden irrigation pipe, rigid lawn and garden irrigation pipe, and combinations thereof.

11. The self-watering trays as claimed in claim 9, wherein a female end of one of said garden water hoses is attached to said internal water manifold of said self-watering planters.

12. The self-watering trays as claimed in claim 9, wherein said self-watering tray container distal closed bottom end has at least one drainage orifice.

13. The self-watering trays as claimed in claim 9, wherein said internal water manifold has two water distribution channels at right angles.

14. The self-watering trays as claimed in claim 13, wherein one of the plurality of self-watering trays has a terminal end cap on said water exit male connector.

15. The self-watering trays as claimed in claim 14, further comprising another terminal end cap on another of the plurality of self-watering trays exit male connectors.

16. The self-watering trays as claimed in claim 9, wherein said water manifold mounting channel comprises two water distribution channels at substantially right angles, and said internal water manifold comprises water manifolds mounted in said two water distribution channels.

17. The self-watering trays as claimed in claim 9, wherein said self-watering trays are suitable to said non-self-watering planters of a plurality of sizes.

* * * * *